Feb. 10, 1942.      A. H. LAMB      2,272,714
RELAY APPARATUS
Filed April 8, 1940
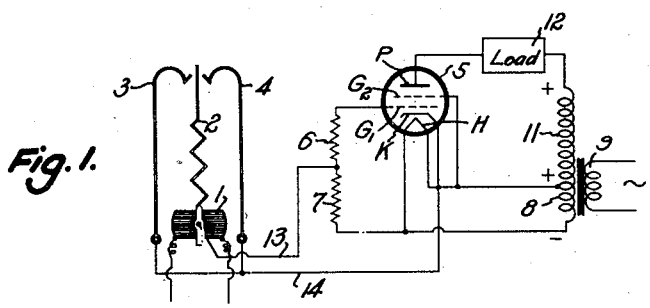
Fig. 1.
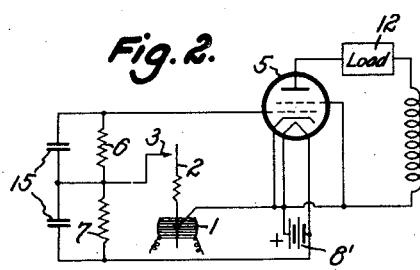
Fig. 2.
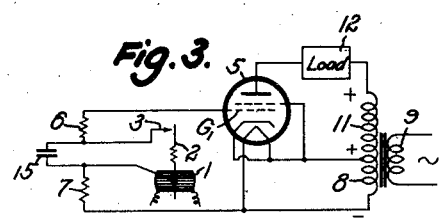
Fig. 3.
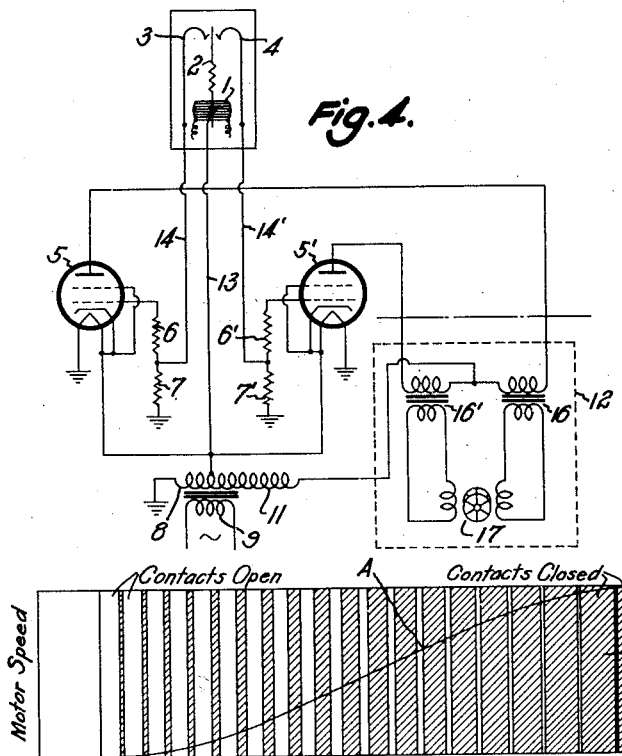
Fig. 4.
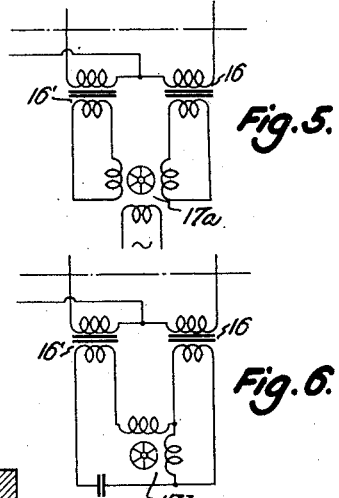
Fig. 5.
Fig. 6.
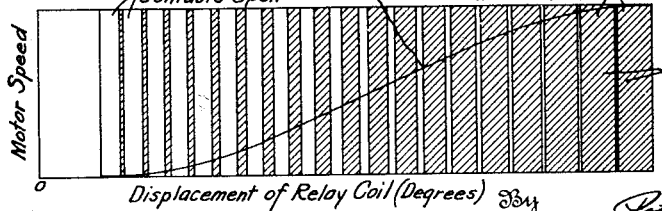
Fig. 7.
Inventor:
Anthony H. Lamb,
Potter, Pierce & Scheffler,
Attorneys.

Patented Feb. 10, 1942

2,272,714

UNITED STATES PATENT OFFICE 2,272,714

RELAY APPARATUS

Anthony H. Lamb, Elizabeth, N. J., assignor to Weston Electrical Instrument Corporation, Newark, N. J., a corporation of New Jersey Application April 8, 1940, Serial No. 328,582

7 Claims. (Cl. 172—179)

This invention relates to relay apparatus and particularly to relay apparatus that combines the apparently contradictory characteristics of extremely high sensitivity and of reliable operation.

Electrical measuring instruments of high sensitivity have been available for many years for the measurement of minute voltages or currents that fluctuate with various quantities or factors such as temperature, pressure, humidity or the like. The mechanical forces developed by electrical instruments of extremely high sensitivity are of a negligible magnitude and are not sufficient to effect a reliable engagement of relay circuit contacts for the direct control of recording or control apparatus. Various types of auxiliary equipment have been developed for use between a sensitive instrument type relay and the ultimate recording or control unit, and it has also been proposed to provide the primary instrument relay with magnetic contacts to obtain reliable contact engagements that can carry a substantial current for the direct operation of the recording or control element. The objective of the prior arrangements has been, in general, to obtain a reliable engagement of the contacts of a sensitive measuring instrument by mechanical or magnetic systems, and the "depressor bar" and magnetic contact systems have been used commercially and have proved quite satisfactory in the particular fields and under the operating conditions for which they were designed.

According to the present invention, advantage is taken of an operating condition that has been considered to be the most disturbing characteristic of instrument relays of high sensitivity, i. e. the continuous oscillation or "fluttering" of a measuring system of high sensitivity. Such oscillations cannot be entirely eliminated when the relays are mounted on rigid structures such as the walls of factories or manufacturing plants, and the oscillations may be of a relatively high order in the case of instrument relays on ships or aircraft. The prior systems for preventing a fluttering engagement of the instrument relay contacts by mechanical or magnetic means have introduced a delay in the relay or control operation that results in a periodic or step-by-step operation of the recording or control system. This step-by-step operation is substantially eliminated by the present invention and the control action varies progressively with the departure of the moving system of the primary instrument relay from a preselected control position.

An object of the present invention is to provide relay apparatus that has the desirable characteristics of high sensitivity and high reliability. An object is to provide relay apparatus including a sensitive instrument relay, of an electrical or mechanical type, and a vacuum tube relay controlled by the instrument relay, the load or device that is to respond to the instrument relay being in the plate circuit of the vacuum tube relay. An object is to provide relay apparatus including an instrument relay having a moving system for displacing a contact arm with respect to a fixed contact, a load device to be regulated or energized in accordance with the departure of the moving system of the instrument relay from a preselected position, and an auxiliary relay comprising one or more vacuum tubes between the instrument relay and the load device. More specifically, an object is to provide relay apparatus of the type last stated in which the load device is a reversible motor of the impulse type. A further object is to provide a relay apparatus including a sensitive instrument relay having a moving system controlling flexible contacts that vibrate continuously, a vacuum tube or plurality of tubes for which the grid bias is controlled by the engagement of the flexible contacts of the instrument relay, and a controlled device in circuit with the tube or tubes, the circuit arrangements being such that the load device is controlled progressively in accordance with the departure of the moving system of the instrument relay from a preselected position. An object is to provide a relay apparatus for energization from an alternating current source, for example a conventional 110 volts 60 cycles power circuit; the apparatus including an instrument relay having a contact arm movable between a pair of spaced and vibratory contacts to control the current output of a pair of vacuum tubes, an impulse motor in the output circuits of said tubes and adapted to rotate in different directions in accordance with closure of the relay contact arm upon one or the other of the vibratory contacts, the impulse motor being designed to reach normal rotative speed within one half-cycle of the alternating current, whereby the operating speed of the motor depends upon the integrated time of closure of the relay contacts.

These and other objects and advantages of the invention will be apparent from the following specification when taken with the accompanying drawing in which:

Figs. 1 to 4, inclusive, are circuit diagrams of relay or control circuits embodying the invention;

Figs. 5 and 6 are fragmentary circuit diagrams of modifications of the Fig. 4 circuit; and Fig. 7 is a curve sheet showing the relation between the motor speed and the magnitude of the displacement of the moving system of the relay from its zero position of balance.

In Fig. 1 of the drawing, the reference numeral 1 identifies the moving coil of a sensitive electrical relay of the instrument type that may be connected to a current or voltage source, not shown, having an output that varies with a quantity such as temperature, pressure, humidity, illumination or the like. The coil carries a contact arm 2 that is displaced between a pair of relatively stationary contacts 3, 4 in accordance with changes in the output from the current or voltage source. The contact arm and contacts are highly flexible strips or wires that are continuously vibrating over small amplitudes. The contact arm 2 may be reversely bent or loosely coiled, as shown in Fig. 1, to promote vibration, and the contacts 3, 4 may be relatively long and thin strips of resilient metal. When space requirements prevent the use of long contact members, the contacts 3, 4 may also be bent or coiled to promote vibration.

It is well known that contacts of this type cannot control heavy current flows when engaged by a sensitive moving system that develops only a minute pressure between the contact arm and the contacts. An auxiliary relay, specifically a grid controlled gas tetrode having the characteristics of tubes known commercially as types 2050 and 2051, is arranged between the instrument relay contacts and the device or load circuit that is to be controlled. The circuits may be designed for the energization of the load device upon a closure or upon an opening of the instrument relay contacts, and both types of control circuits will be described.

In the Fig. 1 circuit, the control grid $G_1$ of the tube 5 is connected to one terminal of the heater H through serially connected resistors 6, 7 that may be of the order of 1 megohm or more. The heater circuit is energized by the section 8 of the secondary of a transformer having primary winding 9 that may be connected across the usual 110 volts, 60 cycles power and light circuit. The cathode K and outer grid $G_2$ are connected to the other terminal of the heater H, and the grid $G_1$ is thus normally biased by the voltage drop across the heater. Another section 11 of the secondary winding is connected to the plate P of the tube 5 through an alarm or control element 12 that constitutes the load device that is to be energized by the instrument relay. The relay contact arm 2 is connected to the junction of the resistors 6, 7 by a lead 13, and relay contacts 3, 4 are joined to each other and to the cathode K by a lead 14.

The operation of the Fig. 1 circuit is as follows. Conduction through the tube 5 is blocked on half-cycles during which the potential of plate P is negative with respect to the cathode K. During the alternate half-cycles when the potentials at the transformer secondary are as indicated by symbols "+" and "−," the control grid $G_1$ is normally at a potential more negative than that of the cathode K by the voltage drop across the heater H, i. e. by the potential across the secondary 8. This normal condition of zero current flow through the load exists so long as the instrument contact arm 2 is spaced from the contacts 3 and 4. A contact closure brings the potential of the control grid $G_1$ substantially to that of the cathode K, and the tube therefore passes current during half-cycles when the plate P is at a positive potential.

The basic circuit of Fig. 2 is similar to that of Fig. 1 but includes a battery 8' for supplying direct current to the heater H, and a transformer with a single secondary 11 for energizing the plate and load circuit with alternating current. Condensers 15 may be shunted across the sections 6, 7 of grid bias resistor when a time delay action is desired. For simplicity, only a single fixed contact 3 is illustrated at the instrument relay, but the relay and tube are otherwise as shown in Fig. 1.

The circuit of Fig. 3 includes a transformer identical with that of Fig. 1 for energizing the heater and plate circuits but the relay is connected into the grid bias circuit in such manner that current normally flowing in the load circuit is interrupted by a closure of the relay contacts. As shown, the resistor sections 6, 7 are not joined to each other but are connected respectively to the contact arm 2 and the contact 3 of the relay, the contacts being shunted by a condenser 15 when a time delay is desired. The control grid $G_1$ is normally "floating" and assumes a potential which permits current flow on alternate half-cycles when the plate potential is positive. Upon engagement of the relay contacts, the grid $G_1$ is biased by the potential drop across the heater H and conduction is thus blocked when the plate potential is positive.

In practice, stable operation with tubes of types 2050 and 2051 has been had with control grid voltage changes of about 3 volts at 1 microampere, and grid circuit resistors of from 3 to 10 megohms. The difficulties previously experienced with poor contact closures in prior sensitive relays are substantially eliminated as the required grid voltage swings are obtained with the described vibratory contacts in spite of oxide or other films that may tend to form on the contacts. The continuous vibration, although so small that it may be difficult to detect with the naked eye, results in an impact and sliding of the contacts that removes or breaks through high resistance films that may form on the contacts. The vibratory contacts have the further advantage of providing a control action that varies in magnitude with the extent of the departure of the relay contact arm from its normal or electrical zero position. When the load device 12 is an alarm, for example a bell or signal lamp, a succession of momentary engagements of the relay contacts results in a slight vibration of the bell armature or a flickering of the signal lamp that indicates the controlling condition is approaching a value at which a definite alarm signal should be produced. The fluctuating engagement of the vibratory contacts is particularly advantageous when the load device is an impulse motor since the effective speed of the motor over a period of non-continuous engagement of the relay contacts varies with the integrated time of contact engagement.

As shown in Fig. 4, the load device 12 is a reversible impulse motor that is controlled by a circuit of the general type shown in Fig. 1. A pair of tubes 5, 5' are used in place of the single tube of Fig. 1, the circuit elements of tube 5' being identical with those of tube 5 but identified by primed reference numerals. Contact arm 2 of the instrument relay is connected to the junction of the sections 8, 11 of the transformer secondary by a lead 13, and contacts 3, 4 are connected to the junction of resistors 6, 7 and 6', 7' by leads 14, 14', respectively. The plate circuits of tubes 5, 5' include the primary windings of transformers 16, 16', respectively, that feed the field windings of a reversible motor 17 of the double field, double rotor type. As will be understood by those familiar with the art, the motor 17 may actuate an indicating device such as the pen of a recorder or a control device such as a valve or resistance to correct for the variation in the control condition that resulted in an engagement of the relay contact arm 2 with contact 3 or 4.

As shown in Fig. 5, the reversible motor 17a may be of the wound shading pole type that is energized from an alternating current source, or it may be, as shown in Fig. 6, a motor 17b of the "condenser and starting coil" type.

The general method of operation of the reversible motor systems of Figs. 4 to 6 is similar to that of the Fig. 1 circuit in that neither field winding receives current when the relay contacts are open. Both field windings would normally receive current, thus locking the motor against rotation, when the grid circuits of tubes 5, 5' are of the type shown in Fig. 3. In either case, the motor operates when only one field winding receives current from the control tubes, and the direction of rotation is determined by the particular winding that is individually energized.

The current flow in the primary windings of the transformers is a pulsating half-cycle direct current but the motor fields receive an alternating current from the secondary windings. The alternating current is produced in the following manner. On half-cycles when the tube is conductive, a direct current pulse in the transformer primary charges the iron core and induces a voltage in the secondary winding which causes current flow in one direction through the field winding for one-half cycle. As the energizing alternating current voltage goes through zero and starts the next half-cycle in reverse direction, the tube becomes non-conductive and the plate current remains at zero throughout that half-cycle. The transformer magnetic field collapses during the half-cycle and induces a current in the secondary winding in the reverse direction. The pulsating direct current in the primary winding thus results in an alternating current supply to the motor field winding. The same action may be obtained with auto-transformer or choke coil couplings between the plate circuits and the motor windings.

The speed of the motor 17 varies with the angular displacement of the moving system of the relay when the motor is of the impulse type and designed to reach full speed in about one-half cycle of the alternating current source feeding the transformer primary 9. The continuous vibrations of the flexible contact members result in a series of momentary contact closures as the angular displacement of the moving system of the relay approaches the value at which rigid contact members would engage, and the length of each period of contact engagement increases with the displacement of the moving system until a continuous or almost continuous engagement of the contact members is obtained. The relative duration of the open and closed condition of the contacts for different angular displacement of the relay coil 1 is shown graphically in Fig. 7 by the relative widths of the hatched areas a and the adjacent spaces. The corresponding motor speed for different displacements of the coil 1 is indicated by the curve A.

The variable motor speed is particularly useful in recording and control apparatus when the quantity that actuates the instrument relay is subject to rapid fluctuations of different magnitudes. The recording pen or control element is adjusted by the motor at a speed corresponding to the angular displacement of the relay coil 1 but "hunting" is eliminated as the motor falls off as the new balance condition is approached.

The several described embodiments of the invention indicate that there is considerable latitude in the circuit design of the relay and control apparatus, and it is to be understood that other modificaions fall within the spirit of my invention as set forth in the following claims.

I claim:

1. A relay apparatus comprising a sensitive instrument type relay having a pair of relatively movable contact members, said members being highly flexible and continuously vibrating, a gas filled electronic tube having a control grid cooperating with a cathode and an anode, a plate-cathode circuit for said tube including a load device and a source of plate potential, and means including said relay contact members for controlling conduction through said tube.

2. A relay apparatus comprising a sensitive instrument type relay having a contact arm movable between two relatively fixed contacts, said contact arm and contacts being highly flexible and continuously vibrating, a pair of gas filled electronic tubes each having a control grid cooperating with a cathode and an anode, a plate-cathode circuit for each tube including a load device and a source of plate potential, and grid-cathode circuits for said tubes, each grid-cathode circuit including said contact arm and one of said contacts for controlling conduction through the associated tube.

3. A relay apparatus comprising an instrument type relay having a moving system for displacing a contact arm between a pair of relatively stationary and continuously vibrating flexible contacts, a pair of vacuum tubes of the type including a grid cooperating with a cathode and an anode, anode-cathode circuits for the respective tubes and each including the primary winding of a transformer and an alternating current source, a motor having a pair of field windings for determining the direction of rotation of the motor, said field windings being connected to the secondary windings of the respective transformers, and grid-cathode circuits for said tubes, each grid-cathode circuit including a source of bias potential and means controlled by said contact arm and one of said contacts for varying the effective grid bias to control conduction through said tube.

4. A relay apparatus as claimed in claim 3, wherein said contact arm and contacts are highly flexible and continuously vibrating, whereby the integrated time of closure of said contact arm upon either contact varies with the displacement of said moving system, and said motor is of the impulse type and attains full speed in aproximately one-half cycle of the alternating current supply to said plate-cathode circuits, whereby the speed of said motor varies with the displacement of the moving system of the relay.

5. In a relay system, an alternating current motor of the impulse type adapted to reach full speed in approximately one-half cycle, an instrument type relay having a moving system for displacing a highly flexible and continuously vibrating contact member with respect to a relatively fixed and continuously vibrating flexible contact member, and means including a grid controlled gas tube for energizing said motor during periods of engagement of said contact members, whereby the speed of said motor varies with the displacement of the moving system of the relay.

6. In a relay system, a reversible alternating current motor of the impulse type adapted to reach full speed in approximately one-half cycle, an instrument type relay including a movable system for displacing a contact arm between a pair of contacts, and means controlled by the engagement of said contact arm with the respective contacts for energizing said motor for operation in different directions, said contact arm and contacts being highly flexible and continuously vibrating, whereby the integrated type of closure of said contact arm on either contact varies with the displacement of the moving system of the relay.

7. In a relay system, the invention as claimed in claim 6, wherein said means includes a pair of grid controlled gas tetrodes having output circuits for supplying impulses to said motor to effect operation thereof in opposite directions, and input circuits including the contact arm and contacts of said relay for controlling conduction through the respective tubes.

ANTHONY H. LAMB.